(12) United States Patent
Lee

(10) Patent No.: US 7,612,858 B2
(45) Date of Patent: Nov. 3, 2009

(54) SOURCE PLATE FOR LIQUID CRYSTAL DISPLAYS, AND LIQUID CRYSTAL DISPLAY DEVICE HAVING SOURCE PLATE

(75) Inventor: Hak Sung Lee, Suwon-si (KR)

(73) Assignee: Samsung Mobile Display Co., Ltd., Yongin, Gyeonggi-do ( * ) Notice: Subject to any disclaimer, the term of this patent is extended or adjusted under 35 U.S.C. 154(b) by 96 days.

(21) Appl. No.: 11/858,459

(22) Filed: Sep. 20, 2007

(65) Prior Publication Data

US 2008/0158497 A1 Jul. 3, 2008

(30) Foreign Application Priority Data

Jan. 2, 2007 (KR) .................... 10-2007-0000369

(51) Int. Cl.
*G02F 1/1339* (2006.01)
(52) U.S. Cl. ...................... 349/154; 349/153
(58) Field of Classification Search .......... 349/153–154
See application file for complete search history.

(56) References Cited

U.S. PATENT DOCUMENTS

| 5,335,103 | A  | * | 8/1994  | Kim ........................... 349/154 |
| 6,490,022 | B1 | * | 12/2002 | Hoshino ..................... 349/153 |
| 6,940,576 | B2 | * | 9/2005  | Imayama et al. ............ 349/153 |
| 2004/0080703 | A1 | * | 4/2004 | Lai et al. .................... 349/153 |

FOREIGN PATENT DOCUMENTS

| JP | 2000-147531 | 5/2000 |
| JP | 2005-345584 | 12/2005 |
| KR | 1998-30903 | 8/1998 |
| KR | 2001-65171 | 7/2001 |
| KR | 2003-47432 | 6/2003 |
| KR | 2005-93006 | 9/2005 |
| KR | 2006-24153 | 3/2006 |

OTHER PUBLICATIONS

Office Action issued by the Korean Intellectual Property Office on Oct. 31, 2007.

* cited by examiner

*Primary Examiner*—Charlie Peng
(74) *Attorney, Agent, or Firm*—Stein McEwen, LLP

(57) ABSTRACT

A source plate for a liquid crystal display, a fabrication method thereof, and a liquid crystal display produced by the method. The source plate includes a first substrate, including a plurality of pixel regions having first electrodes respectively disposed therein; a second substrate, including a plurality of pixel regions having second electrodes disposed therein, positioned to be in opposition to the first substrate; a sealing agent surrounding each pixel region, disposed between the first substrate and the second substrate; a liquid crystal inlet disposed at an opening in each of the sealing agents; an assistance sealing agent disposed between adjacent sealing agents; and a liquid crystal disposed in the pixel regions. The method includes forming the assistance sealing agents to prevent injected liquid crystal from entering a space between the pixel regions.

9 Claims, 3 Drawing Sheets

US 7,612,858 B2

SOURCE PLATE FOR LIQUID CRYSTAL DISPLAYS, AND LIQUID CRYSTAL DISPLAY DEVICE HAVING SOURCE PLATE

CROSS-REFERENCE TO RELATED APPLICATION

This application claims the benefit of Korean Application No. 2007-369, filed Jan. 2, 2007, in the Korean Intellectual Property Office, the disclosure of which is incorporated herein by reference.

BACKGROUND OF THE INVENTION

1. Field of the Invention

Aspects of the present invention relate to a source plate for a liquid crystal display a method for fabricating a liquid crystal display.

2. Description of the Related Art

There has been an increasing demand for display devices due to the growth of the information and communications industries. Recently, there has been an increase in the demand for high resolution displays that are small, light weight, thin, and have low power requirements. In order to satisfy this demand, liquid crystal displays that use organic light emitters have been developed.

One of the most widely used type of flat panel displays is a thin film transistor-liquid crystal display (TFT-LCD). TFT-LCD's are thin, have excellent color reproducibility, and low power consumption. The TFT-LCD's include a display panel that has liquid crystal injected between two substrates, a back light source that is positioned in a lower part of the display panel, and a drive IC to drive the display panel.

FIG. 1 is a plane view illustrating part of a substrate of a source plate for a conventional liquid crystal display, having an array-type display panel.

FIG. 2 is a cross-sectional view taken along line A1-A2 of FIG. 1.

A plurality of gate lines and data lines are arranged in a matrix, in a pixel region of a lower substrate 10. Pixels are defined by a plurality of the gate lines and the data lines which cross each other. A thin film transistor, controls a signal supplied to the each pixel, and a pixel electrode connected with the thin film transistor, are each disposed where the gate lines and the data lines cross each other.

A color filter and a common electrode are disposed in the pixel region of an upper substrate 20, and a sealing agent 30 is positioned in a non-pixel region of the upper substrate 20. The sealing agent 30 surrounds the pixel region, and a liquid crystal inlet 40 is formed in one side of the sealing agent 30, and is used as an injection point for the liquid crystal. A dispersion plate 31 may be positioned at the liquid crystal inlet 40, in order to allow for the uniform injection of the liquid crystal 50 into the pixel region.

The lower substrate 10 and the upper substrate 20 are positioned opposite of each other, and they are joined together by the sealing agent 30. The liquid crystal 50 is injected, in a space between the lower substrate 10 and the upper substrates 20 of the pixel region, through the liquid crystal inlet 40. The injection can involve soaking the lower substrate 10 and the upper substrate 20 in a container containing the liquid crystal 50.

Polarizing plates (not shown) adhere to the rear of the lower substrate 10 and the upper substrate 20, respectively, after sealing the liquid crystal inlet 40.

However, in a conventional liquid crystal display, fabricated as described above, there is an open space 60 between adjacent sealing agents 30, such that the liquid crystal 50 that is injected, flows into the space 60. Accordingly, the liquid crystal 50 that flows into the space 60 is wasted, thus increasing production costs and fabrication expenses.

SUMMARY OF THE INVENTION

An aspect of the present invention is to provide a liquid crystal display source plate capable of reducing the amount of liquid crystal wasted during manufacturing.

Another aspect of the present invention is to provide a liquid crystal display that is less expensive to fabricate.

A source plate, according to the above and/or other aspects of the present invention, includes a first substrate, including first electrodes disposed on a plurality of pixel regions thereof; a second substrate disposed in opposition to the first substrate, including second electrodes disposed on a plurality of pixel regions thereof; sealing agents surrounding each pixel region, and are positioned between the first substrate and the second substrate; gaps in the sealing agents form liquid crystal inlets; and assistance sealing agents positioned between adjacent sealing agents. Liquid crystal is injected between the first substrate and the second substrate, through the liquid crystal inlets. The assistance sealing agents prevent the liquid crystal from entering the space between the sealing agents.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
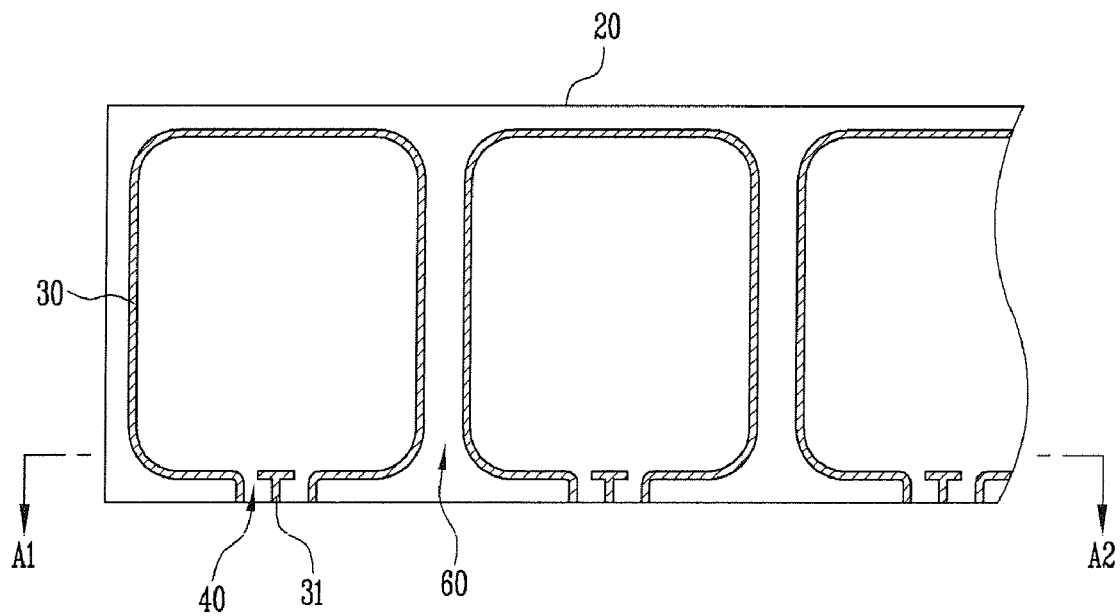
FIG. 1 illustrates a plane view of a conventional source plate for liquid crystal displays.
Figure 2:
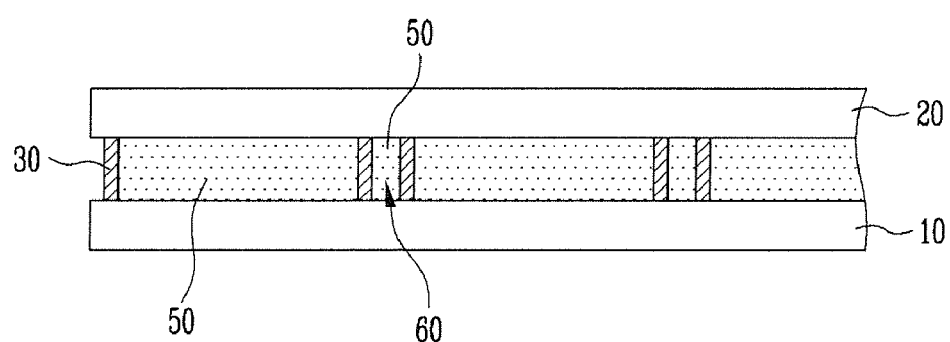
FIG. 2 illustrates a cross-sectional view taken along the line A1-A2 of FIG. 2.

Reference will now be made in detail to the present embodiments of the present invention, examples of which are illustrated in the accompanying drawings, wherein like reference numerals refer to the like elements throughout. The embodiments are described below in order to explain the present invention by referring to the Figures.

Figure 3:
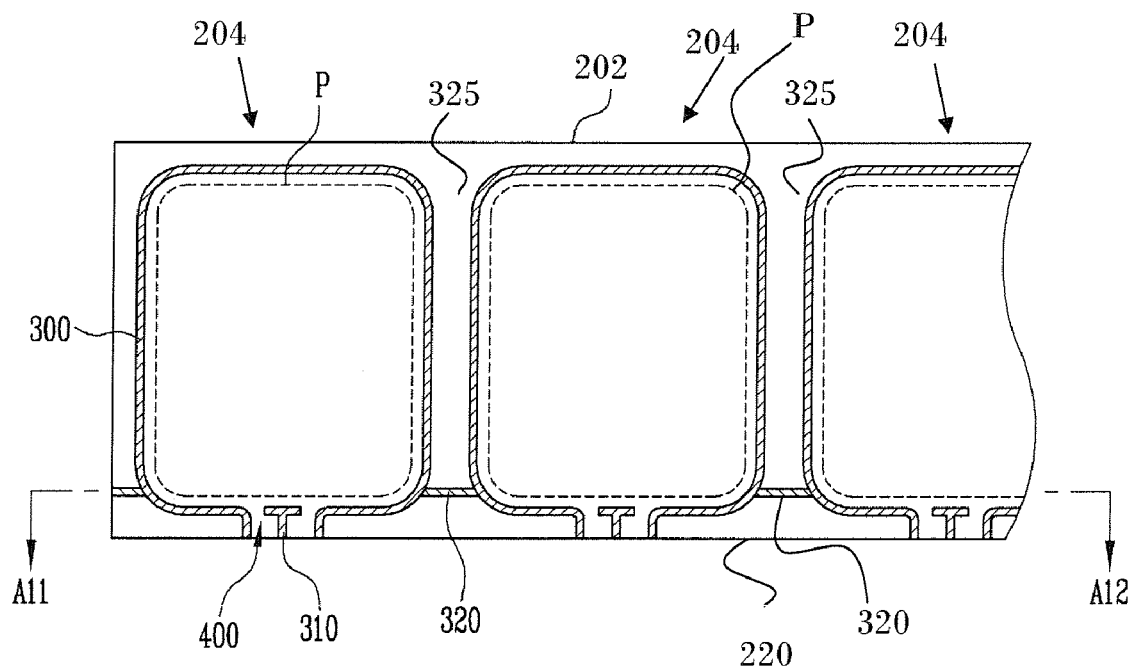
FIG. 3 illustrates a plane view of a source plate for liquid crystal displays, according to aspects of the present invention.
Figure 4:
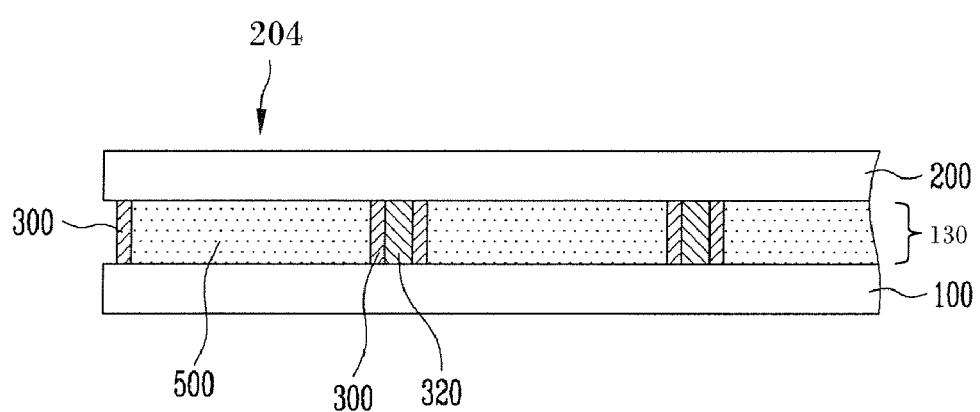
FIG. 4 illustrates a cross-sectional view taken along the line A11-A12 of FIG. 3.

FIG. 3 is a plane view of a source plate, according to an embodiment of the present invention, and illustrates a part of a substrate of an array-type liquid crystal display. FIG. 4 illustrates a cross sectional view take along the line A11-A12 of FIG. 3.

Referring to FIG. 3 and FIG. 4, a source plate 202 comprises a plurality of liquid crystal displays 204. Each liquid crystal display 204 includes: a lower substrate 100, including pixel electrodes, disposed in a pixels regions P; an upper substrate 200 disposed opposite the lower substrate 100, including one or more transparent electrodes disposed in the pixel regions P; a plurality of sealing agents 300, disposed in a space 130 between the lower substrate 100 and the upper substrate 200, and generally surrounding the pixel regions P; and a plurality of liquid crystal inlets 400 formed at a gap in each of the sealing agents 300. A plurality of assistance sealing agents 320 are positioned between adjacent portions of the sealing agents 300. The assistance sealing agents 320 can connect at least one of the sealing agents to an edge of the source plate. Liquid crystal 500 can be injected between the lower substrate 100 and the upper substrate 200, and into the pixel regions P, through the liquid crystal inlets 400.

The sealing agents 300 surround each pixel region P, and the assistance sealing agents 320 are disposed between adjacent portions of the sealing agents 300. The assistance sealing agents can be any suitable shape, for example, strip-shaped, rectangular, ovoid, and the like. The liquid crystal inlets 400 are formed from gaps in each of the portions of the sealing agents 300 that surround the pixel regions P. The liquid crystal inlets can be used to inject the liquid crystal 500 into the pixel regions P. The assistance sealing agents 320 can prevent the flow of liquid crystal into spaces 325 between the pixel regions P. A dispersion plate 310 may be disposed in each of the liquid crystal inlets 400. The dispersion plates 310 can allow for the uniform injection of the liquid crystal 500 into the pixel region P. The dispersion plates 310 can form an inlet and an outlet in the liquid crystal inlet. The liquid crystal can be injected into the inlet and gas can escape from the pixel area through the outlet. The sealing agents 300, the assistance sealing agents 320, and the dispersion plate 310, may be formed substantially simultaneously in one fabricating operation, and may comprise the same material. For example, the sealing agents 300, the assistance sealing agents 320, and the dispersion plates 310, may comprise epoxy deposited in one operation.

Figure 5:
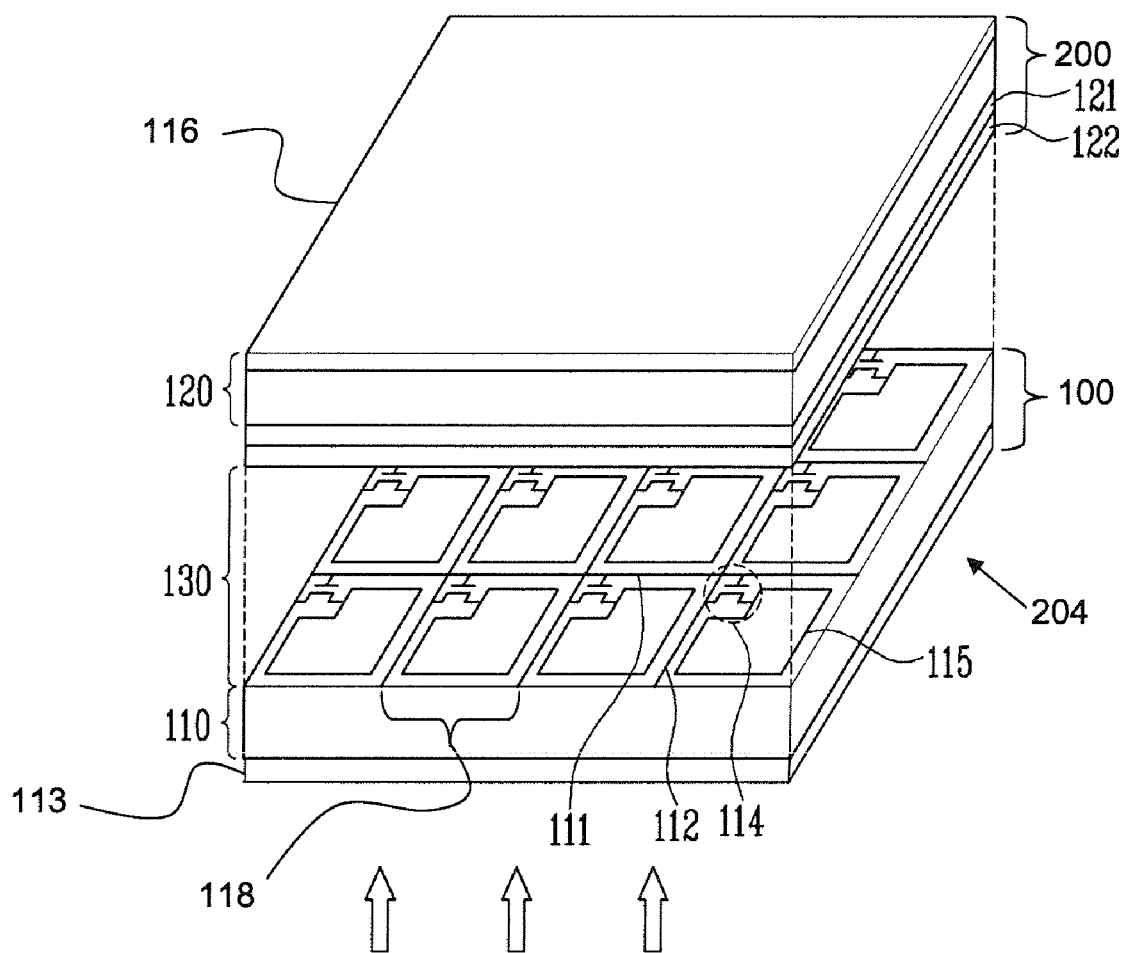
FIG. 5 illustrates an exploded perspective view of a liquid crystal display, according to aspects of the present invention.

FIG. 5 is an exploded perspective view illustrating a liquid crystal display 204 of FIG. 3.

A drive IC (not shown), to drive the liquid crystal 500, is disposed outside of the pixel region P, on the lower substrate 110. The drive IC includes a printed circuit board (PCB) having components, which produce a scan signal, a data signal, and the like. The drive IC can include a drive circuit to produce and send signals to gate lines and data lines as described below. The drive IC supplies the scan signals and the data signals to the gate lines and the date lines, according to an external electric signal provided through a flexible printed circuit (FPC) electrically connected to a pad unit.

The liquid crystal display 204 comprises a portion of the lower substrate 100, and the upper substrate 200. The lower substrate 100 comprises a lower plate 110, and a polarizing plate 113 that is adhered to the lower plate 110. A back light (not shown) is disposed adjacent to the lower substrate 110. The back light can project light through the pixel region P of the liquid crystal display device.

The lower substrate 100 comprises a plurality of gate lines 111 and a plurality of data lines 112. The gate lines 111 and the data lines 112 are arranged in a matrix, disposed in the pixel region P. The gate lines 111 and the data lines 112 define individual pixels 118. Each pixel 118 includes a thin film transistor 114 and a pixel electrode 115. The pixel electrodes 115 comprise a transparent electrically conductive material. The thin film transistor 114 is to control the flow of electricity to each pixel electrode 115. The pixel electrodes 115 can electrically stimulate liquid crystal adjacent thereto, causing the molecules of liquid crystal to align and thereby affect the amount of light transmitted through the pixel 118, from the back light.

The upper substrate 200 comprises an upper plate 120, a color filter 121, and a common electrode 122. The color filter 121, comprises red, green, and blue filters, and is disposed upon the common electrode 122. The common electrode 122 comprises a transparent conductive material, and is disposed on the upper substrate 100. The common electrode 122 can comprise antimony tin oxide. The liquid crystal 500 is disposed in the pixel regions P, in the space 130, between the upper substrate 200 and the lower substrate 100.

According to various embodiments, the source plate 202 and the liquid crystal display 204 panels can be fabricated by disposing the lower substrate 100 and the upper substrate 200, opposite to each other. The sealing agents 300 are disposed therebetween. For example, the sealing agents 300 can be put on the lower substrate 100 such that they surround, or partially surrounds each pixel region P. The assistance sealing agents 320 and the dispersion plates 310 can also be laid down at this time. The upper plate 200 can then be disposed in opposition to the lower plate 100, and upon the sealing agents 320. The sealing agents 300 can be cured to join to the lower plate 100 and the upper plate 200.

A liquid crystal injection unit can inject the liquid crystal 500 into the display devices. This injection can comprise moving the injection unit past a side 220 of the source plate that comprises the liquid crystal inlets 400, while injecting liquid crystal 500. In the alternative, liquid crystal can be injecting into the liquid crystal display devices by submerging the side 220 of the source plate including a reservoir of the liquid crystal 500, such that liquid crystal is taken up into the liquid crystal display devices 204. In either method, the liquid crystal 500 is prevented from entering the space 325 between the liquid crystal displays 204, by the assistance sealing agents 320.

In a source plate, according to aspects of the present invention, the spaces 325 between the adjacent sealing agents 300 may be sealed by the assistance sealing agents 320. This prevents the waste associated with the liquid crystal 500 being injected into the spaces 325.

In order to minimize the waste of the liquid crystal 500, it is desirable to dispose the assistance sealing agents 320 adjacent to the liquid crystal inlets 400.

When the liquid crystal 500 injection is completed, the inlets 400 can be sealed by, for example, heat sealing. The polarizing plate 113 can be then adhered to the rear of the lower plate 100, and the polarizing plate 116 can adhered to the upper plate 200 to form the lower substrate 100 and upper substrate 200, respectively. The lower substrate 100 and the upper substrate 200 are then cut along the space 325, and the liquid crystal display 204 panels are separated.

As described above, in aspects of the present invention, a sealing agents are deposited to surround the pixel regions, and spaces between adjacent sealing agents are sealed by the assistance sealing agents. Accordingly, the liquid crystal may not be injected into unnecessary spaces when injecting the liquid crystal. Therefore, it is possible to minimize the waste of the liquid crystal, and unit cost/fabricating expense is reduced.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A source plate for liquid crystal displays, comprising:
   a first substrate;
   a second substrate disposed opposite to the first substrate;

a plurality pixel regions, each comprising first electrodes disposed in the first substrate and second electrodes disposed in the second substrate;

a plurality of sealing agents disposed between the first substrate and the second substrate, each sealing agent surrounding one of the pixel regions;

liquid crystal inlets disposed at an opening of each of the sealing agents;

a plurality of assistance sealing agents disposed between adjacent sealing agents, to prevent a liquid crystal from entering spaces between the sealing agents; and a dispersion plate disposed in each of the liquid crystal inlets, wherein the sealing agents, the assistance sealing agents, and the dispersion plates, are formed of the same material.

2. The source plate of claim 1, wherein the assistance sealing agents are disposed adjacent to the liquid crystal inlets.

3. The source plate of claim 1, wherein the assistance sealing agents, the sealing agents, and the dispersion plates comprise an epoxy.

4. The source plate of claim 1, wherein the second electrodes are common electrodes.

5. The source plate of claim 1, wherein the assistance sealing agents are strip-shaped.

6. The source plate of claim 5, wherein one or more of the assistance sealing agents connect adjacent sealing agents.

7. The source plate of claim 5, wherein one or more of the assistance sealing agents extend from a sealing agent to an edge of the source plate.

8. The source plate of claim 5, wherein one or more of the assistance sealing agents connect adjacent sealing agents, and one or more of the assistance sealing agents extend from a sealing agent to an edge of the source plate.

9. A liquid crystal display device comprising a source plate, the source plate comprising: a first substrate; a second substrate disposed opposite to the first substrate;

a plurality pixel regions, each comprising first electrodes disposed in the first substrate and second electrodes disposed in the second substrate;

a plurality of sealing agents disposed between the first substrate and the second substrate, each sealing agent surrounding one of the pixel regions;

liquid crystal inlets disposed at an opening of each of the sealing agents; and a plurality of assistance sealing agents disposed between adjacent sealing agents, to prevent a liquid crystal from entering spaces between the sealing agents, a dispersion plate disposed in each of the liquid crystal inlets, wherein the sealing agents, the assistance sealing agents, and the dispersion plates, are formed of the same material.

* * * * *

UNITED STATES PATENT AND TRADEMARK OFFICE
CERTIFICATE OF CORRECTION

| | | |
|---|---|---|
| PATENT NO. | : 7,612,858 B2 | Page 1 of 1 |
| APPLICATION NO. | : 11/858459 | |
| DATED | : November 3, 2009 | |
| INVENTOR(S) | : Hak Sung Lee | |

It is certified that error appears in the above-identified patent and that said Letters Patent is hereby corrected as shown below:

On the Title Page, Item (73) Assignee, "Yongin, Gyeonggi-do" should be --Yongin, (KR)--.

Column 6, line 9, after "comprising:" insert a paragraph break.

Signed and Sealed this

Sixteenth Day of February, 2010

David J. Kappos
*Director of the United States Patent and Trademark Office*